(12) United States Patent
Viswanath et al.

(10) Patent No.: US 10,400,054 B2
(45) Date of Patent: Sep. 3, 2019

(54) INITIATOR FOR SURFACE-BASED POLYMERIZATION AND USE THEREOF

(71) Applicant: University of South Carolina, Columbia, SC (US)

(72) Inventors: Anand Viswanath, Columbia, SC (US); Brian C. Benicewicz, Columbia, SC (US); Michael H. Bell, Gainesville, FL (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 16/001,027

(22) Filed: Jun. 6, 2018

(65) Prior Publication Data

US 2018/0282464 A1     Oct. 4, 2018

Related U.S. Application Data

(62) Division of application No. 15/373,943, filed on Dec. 9, 2016, now Pat. No. 10,011,674.

(60) Provisional application No. 62/266,290, filed on Dec. 11, 2015.

(51) Int. Cl.
    *C08F 292/00*      (2006.01)
    *C08F 4/04*        (2006.01)

(52) U.S. Cl.
    CPC .............. *C08F 292/00* (2013.01); *C08F 4/04* (2013.01); *C08G 2261/418* (2013.01); *Y02P 20/149* (2015.11)

(58) Field of Classification Search
    CPC ........ C08F 292/00; C08F 4/04; Y02P 20/149; C08G 2261/418
    USPC ........................................ 526/194, 193, 89
    See application file for complete search history.

(56) References Cited

U.S. PATENT DOCUMENTS

| 8,362,151 B2 * | 1/2013 | Li ..................... C08F 120/18 522/116 |
| 2014/0090850 A1 | 4/2014 | Benicewicz et al. |
| 2016/0024234 A1 | 1/2016 | Wang et al. |
| 2016/0257771 A1 | 9/2016 | Benicewicz et al. |

OTHER PUBLICATIONS

Chiefari, John, et al. "Living free-radical polymerization by reversible addition—fragmentation chain transfer: the RAFT process." Macromolecules 31.16 (1998): 5559-5562.

Moad, Graeme, Ezio Rizzardo, and San H. Thang. "Living radical polymerization by the RAFT process—a second update." Australian journal of chemistry 62.11 (2009): 1402-1472.

(Continued)

*Primary Examiner* — William K Cheung
(74) *Attorney, Agent, or Firm* — Dority & Manning, PA

(57) ABSTRACT

Disclosed are polymerization initiators as may be utilized for addition of polymers to a substrate surface. The initiators are azo-based initiators that include multi-functionality through addition of multiple anchoring agents to an inner azo group. Disclosed polymerization initiators can be utilized to form high density and high molecular weight polymers on a surface such as a particulate surface. Formed materials can be beneficial in one embodiment in fracking applications, providing composite proppant/polymer materials that can prevent leakage of polymers from a subterranean geologic formation.

20 Claims, 2 Drawing Sheets

(56) References Cited

OTHER PUBLICATIONS

Kango, Sarita, et al. "Surface modification of inorganic nanoparticles for development of organic—inorganic nanocomposites—a review." Progress in Polymer Science 38.8 (2013): 1232-1261.
Kumar, Sanat K., et al. "Nanocomposites with polymer grafted nanoparticles." Marcromolecules 46.9 (2013): 3199-3214.
Olivier, Aurore, et al. "Surface-initiated controlled polymerization as a convenient method for designing functional polymer brushes: From self-assembled monolayers to patterend surfaces." Progress in polymer science 37.1 (2012): 157-181.
Minakuchi, Hiroyoshi, et al. "Octadecylsilylated porous silica rods as separation media for reversed-phase liquid chromatography." Analytical chemistry 68.19 (1996): 3498-3501.
Mutin, P. Hubert, Gilles Guerrero, and AndréVioux. "Hybrid materials from organophosphorus coupling molecules." Journal of Materials Chemistry 15.35-36 (2005): 3761-3768.
Rungta, Atri, et al. "Grafting bimodal polymer brushes on nanoparticles using controlled radical polymerization." Macromolecules 45.23 (2012): 9303-9311.
Li, Ying, et al. "Bimodal surface ligand engineering: the key to tunable nanocomposites." Langmuir 29.4 (2012): 1211-1220.
Norsten, Tyler B., et al. "Specific hydrogen-bond-mediated recognition and modification of surfaces using complementary functionalized polymers." Langmuir 19.17 (2003): 7089-7093.
Helms, Brett, et al. "Dendronized linear polymers via "click chemistry"." Journal of the American Chemical Society 126.46 (2004): 15020-15021.
Binder, Wolfgang H., and Robert Sachsenhofer. "'Click'chemistry in polymer and material science: an update," Macromolecular Rapid Communications 29.12-13 (2008): 952-981.
Guerrero, G., P. H. Mutin, and A. Vioux. "Anchoring of phosphonate and phosphinate coupling molecules on titania particles." Chemistry of Materials 13.11 (2001): 4367-4373.
Guerrero, Gilles, et al. "Phosphonate coupling molecules for the control of surface/interface properties and the synthesis of nanomaterials." Dalton Transactions 42.35 (2013): 12569-12585.
Granqvist, Claes G., and A. Hultåker. "Transparent and conducting ITO films: new developments and applications." Thin solid films 411.1 (2002): 1-5.
Tao, Peng, et al. "Preparation and optical properties of indium tin oxide/epoxy nanocomposites with polyglycidyl methacrylate grafted nanoparticles." ACS applied materials & interfaces 3.9 (2011): 3638-3645.
Liu, Jin-gang, et al. "Optically transparent sulfur-containing polyimide—TiO2 nanocomposite films with high refractive index and negative pattern formation from poly (amic acid)—TiO2 nanocomposite film." Chemistry of Materials 20.1 (2007): 273-281.
Su, Hung-Wen, and Wen-Chang Chen. "High refractive index polyimide—nanocrystalline-titania hybrid optical materials." Journal of Materials Chemistry 18.10 (2008): 1139-1145.
Tao, Peng, et al. "TiO 2 nanocomposites with high refractive index and transparency." Journal of Materials Chemistry 21.46 (2011): 18623-18629.
Hanson, E. L.; Guo, J.; Koch, N.; Schwartz, J.; Bernasek, S. L. JACS 2005, 10058.
Capozzi, Charles J., et al. "Impedance spectroscopy and optical characterization of polymethyl methacrylate/indium tin oxide nanocomposites with three-dimensional Voronoi microstructures." Journal of Applied Physics 104.11 (2008): 114902.
Khaled, S. M., et al. "Synthesis of TiO2—PMMA nanocomposite: Using methacrylic acid as a coupling agent." Langmuir 23.7 (2007): 3988-3995.
Matsuno, Ryosuke, Hideyuki Otsuka, and Atsushi Takahara. "Polystyrene-grafted titanium oxide nanoparticles prepared through surface-initiated nitroxide-mediated radical polymerization and their application to polymer hybrid thin films." Soft Matter 2.5 (2006): 415-421.
Hojjati, Behnaz, and Paul A. Charpentier. "Synthesis and kinetics of graft polymerization of methyl methacrylate from the RAFT coordinated surface of nano-TiO2." Journal of Polymer Science Part A: Polymer Chemistry 46.12 (2008): 3926-3937.
Hojjati, Behnaz, Ruohong Sui, and Paul A. Charpentier. "Synthesis of TiO 2/PAA nanocomposite by RAFT polymerization." Polymer 48.20 (2007): 5850-5858.
Tchoul, Maxim N., et al. "Assemblies of titanium dioxide-polystyrene hybrid nanoparticles for dielectric applications." Chemistry of Materials 22.5 (2010): 1749-1759.
Aslan, Ayse, and Ayhan Bozkurt. "Nanocomposite polymer electrolyte membranes based on poly (vinylphosphonic acid)/TiO 2 nanoparticles." Journal of Materials Research 27.24 (2012): 3090-3095.
Aamer, Khaled A., and Gregory N. Tew. "RAFT polymerization of a novel activated ester monomer and conversion to a terpyridine-containing homopolymer." Journal of Polymer Science Part A: Polymer Chemistry 45.23 (2007): 5618-5625.
Cengiz, Nergiz, Halil Kabadayioglu, and Rana Sanyal. "Orthogonally functionalizable copolymers based on a novel reactive carbonate monomer." Journal of Polymer Science Part A: Polymer Chemistry 48.21 (2010): 4737-4746.
Eschweiler, Nebia, et al. "Synthesis of $\alpha$, $\omega$-isocyanate telechelic polymethacrylate soft segments with activated ester side functionalities and their use for polyurethane synthesis." Polymer International 63.1 (2014): 114-126.
Fukukawa, Ken-ichi, et al. "Synthesis and characterization of core—shell star copolymers for in vivo PET imaging applications." Biomacromolecules 9.4 (2008): 1329-1339.
Li, Chunzhao, et al. "A versatile method to prepare RAFT agent anchored substrates and the preparation of PMMA grafted nanoparticles." Macromolecules 39.9 (2006): 3175-3183.
Li, Yu, and Brian C. Benicewicz. "Functionalization of silica nanoparticles via the combination of surface-initiated RAFT polymerization and click reactions." Macromolecules 41.21 (2008): 7986-7992.
Hussain, Farzana, et al. "Polymer-matrix nanocomposites, processing, manufacturing, and application: an overview." Journal of composite materials 40.17 (2006): 1511-1575.
Beecroft, Laura L., and Christopher K. Ober. "Nanocomposite materials for optical applications." Chemistry of materials 9.6 (1997): 1302-1317.
Sanchez, Clément, et al. "Applications of hybrid organic—inorganic nanocomposites." Journal of Materials Chemistry 15.35-36 (2005): 3559-3592.
Schadler, Linda S., et al. "Designed interfaces in polymer nanocomposites: A fundamental viewpoint." MRS bulletin 32.4 (2007): 335-340.
Kumar, Sanat K., et al. "Nanocomposites with polymer grafted nanoparticles." Macromolecules 46.9 (2013): 3199-3214.
Tao, P.; Viswanath, A.; Li, Y.; Rungta, A.; Benicewicz, B. C.; Siegel, R. W.; Schadler, L. S. MRS Proc. 2011, 1359, 11.
Kim, Hyunwoo, Yutaka Miura, and Christopher W. Macosko. "Graphene/polyurethane nanocomposites for improved gas barrier and electrical conductivity." Chemistry of Materials 22.11(2010): 3441-3450.
Wang, Hua, et al. "Processing and properties of polymeric nanocomposites." Polymer Engineering & Science 41.11 (2001): 2036-2046.
Sen, S., et al. "Equivalence between polymer nanocomposites and thin polymer films: Effect of processing conditions and molecular origins of observed behavior." The European Physical Journal—Special Topics 141.1 (2007): 161-165.
Jordan, Jeffrey, et al. "Experimental trends in polymer nanocomposites—a review." Materials science and engineering: A 393.1 (2005): 1-11.
Liu, Jun, et al. "Nanoparticle dispersion and aggregation in polymer nanocomposites: insights from molecular dynamics simulation." Langmuir 27.12 (2011): 7926-7933.
Akcora, Pinar, et al. "Anisotropic self-assembly of spherical polymer-grafted nanoparticles." Nature materials 8.4 (2009): 354.
Kuang, Qin, et al. "High-energy-surface engineered metal oxide micro-and nanocrystallites and their applications." Accounts of chemical research 47.2 (2013): 308-318.

(56) References Cited

OTHER PUBLICATIONS

Queffélec, Clémence, et al. "Surface modification using phosphonic acids and esters." Chem. Rev 112.7 (2012): 3777-3807.
Vosloo, J. J., et al. "Controlled free radical polymerization in water-borne dispersion using reversible addition—fragmentation chain transfer." Macromolecules 35.13 (2002): 4894-4902.
Rudnick, L. R. Lubricant Additives: Chemistry and Applications, Second Edition; CRC Press, 2009; p. 790.
Kwak, Yungwan, Renaud Nicolaÿ, and Krzysztof Matyjaszewski. "A Simple and Efficient Synthesis of RAFT Chain Transfer Agents via Atom Transfer Radical Addition—Fragmentation." Macromolecules 42.11 (2009): 3738-3742.
Chong, ) YK, et al. "Thiocarbonylthio compounds [SC (Ph) S—R] in free radical polymerization with reversible addition-fragmentation chain transfer (RAFT Polymerization). Role of the free-radical leaving group (R)." Macromolecules 36.7 (2003): 2256-2272.
Shirasaki, Yasuhiro, et al. "Emergence of colloidal quantum-dot light-emitting technologies." Nature Photonics 7.1 (2013): 13-23.
Kamat, P. V.J. Phys. Chem. Lett. 2013, 4, 908.
Liu, Wenhao, et al. "Compact biocompatible quantum dots via RAFT-mediated synthesis of imidazole-based random copolymer ligand." Journal of the American Chemical Society 132.2 (2009): 472-483.
Zhang, Pengfei, et al. "Click-functionalized compact quantum dots protected by multidentate-imidazole ligands: conjugation-ready nanotags for living-virus labeling and imaging." Journal of the American Chemical Society 134.20 (2012): 8388-8391.
Zimmer, John P, et al. "Size series of small indium arsenide—zinc selenide core—shell nanocrystals and their application to in vivo imaging." Journal of the American Chemical Society 128.8 (2006): 2526-2527.
Bruchez, Marcel, et al. "Semiconductor nanocrystals as fluorescent biological labels." science 281.5385 (1998): 2013-2016.
Wang, M.; Oh, J. K.; Dykstra, T. E.; Lou, X.; Scholes, G. D.; Winnik, M. A.; Ms, C. 2006, 3664.
Yi, Dong Kee, et al. "Silica-coated nanocomposites of magnetic nanoparticles and quantum dots. " J. Am. Chem. Soc 127.14 (2005): 4990-4991.
Kloust, Hauke, et al. "Poly (ethylene oxide) and polystyrene encapsulated quantum dots: highly fluorescent, functionalizable, and ultrastable in aqueous media." (2013).
Schieber, Christine, et al. "Conjugation of Transferrin to Azide-Modified CdSe/ZnS Core—Shell Quantum Dots using Cyclooctyne Click Chemistry." Angewandte Chemie International Edition 51.42 (2012): 10523-10527.
Algar, W. R.; Krull, U. J. Langmuir 2006, 22, 11346.
Zhan, Naiqian, et al. "Multidentate zwitterionic ligands provide compact and highly biocompatible quantum dots." Journal of the American Chemical Society 135.37 (2013): 13786-13795.
Aldeek, Fadi, et al. "Understanding the self-assembly of proteins onto gold nanoparticles and quantum dots driven by metal-histidine coordination." ACS nano 7.11 (2013): 10197-10210.
Petryayeva, Eleonora, and Ulrich J. Krull. "Quantum dot and gold nanoparticle immobilization for biosensing applications using multidentate imidazole surface ligands." Langmuir 28.39 (2012): 13943-13951.
Petryayeva, Eleonara, W. Russ Algar, and Ulrich J. Krull. "Adapting fluorescence resonance energy transfer with quantum dot donors for solid-phase hybridization assays in microtiter plate format." Langmuir 29.3 (2013): 977-987.
Han, Hee-Sun, et al. "Spatial charge configuration regulates nanoparticle transport and binding behavior in vivo." Angewandte Chemie International Edition 52.5 (2013): 1414-1419.
Shen, Lei. "Biocompatible polymer/quantum dots hybrid materials: current status and future developments." Journal of functional biomaterials 2.4 (2011): 355-372.
Shen, Lei, et al. "Loading quantum dots into thermo-responsive microgels by reversible transfer from organic solvents to water." Journal of Materials Chemistry 18.7 (2008): 763-770.

Allen Jr, Michael H., et al. "Controlled radical polymerization of 4-vinylimidazole." Macromolecules 45.9 (2012): 3669-3676.
Weber, Ryan L., et al. "Effect of nanoscale morphology on the conductivity of polymerized ionic liquid block copolymers." Macromolecules 44.14 (2011): 5727-5735.
Hoarfrost, Megan L., and Rachel A. Segalman. "Ionic conductivity of nanostructured block copolymer/ionic liquid membranes." Macromolecules 44.13 (2011): 5281-5288.
Vijayakrishna, Kari, et al. "Synthesis by RAFT and ionic responsiveness of double hydrophilic block copolymers based on ionic liquid monomer units." Macromolecules 41.17 (2008): 6299-6308.
Wiss, Kerstin T., and Patrick Theato. "Facilitating polymer conjugation via combination of RAFT polymerization and activated ester chemistry." Jouranl of Polymer Science Part A: Polymer Chemistry 48.21 (2010): 4758-4767.
Nilles, Katja, and Patrick Theato. "Polymerization of an activated ester monomer based on 4-vinylsulfonic acid and its polymer analogous reaction." Polymer Chemistry 2.2 (2011): 376-384.
Nilles, Katja, and Patrick Theato. "RAFT polymerization of activated 4-vinylbenzoates." Journal of Polymer Science Part A: Polymer Chemistry 47.6 (2009): 1696-1705.
Yanjarappa, Mallinamadugu J., et al. "Synthesis of copolymers containing an active ester of methacrylic acid by RAFT: controlled molecular weight scaffolds for biofunctionalization." Biomacromolecules 7.5 (2006): 1665-1670.
Batz, H.-G.; Franzmann, G.; Ringsdorf, H. Angew. Chemie Int. Ed. English 1972, 11, 1103.
Alb, Alina M., et al. "Quantitative contrasts in the copolymerization of acrylate-and methacrylate-based comonomers." Macromolecules 39.24 (2006): 8283-8292.
Boyer, Cyrille, et al. "Bioapplications of RAFT polymerization. "Chemical Reviews 109.11 (2009): 5402-5436.
Chen, Ming, Graeme Moad, and Ezio Rizzardo. "Thiocarbonylthio end group removal from RAFT-synthesized polymers by a radical-induced process." Journal of Polymer Science Part A: Polymer Chemistry 47.23 (2009): 6704-6714.
Willcock, Helen, and Rachel K. O'Reilly. "End group removal and modification of RAFT polymers." Polymer Chemistry 1.2 (2010): 149-157.
Schneider, Yanika, et al. "Ionic conduction in nanostructured membranes based on polymerized protic ionic liquids." Macromolecules 46.4 (2013): 1543-1548.
Hochbaum, A. I.; Yang, P. Chem. Rev. 2010, 110, 527.
Duan, X.; Lieber, C. M. Adv. Mater. 2000, 12, 298.
Gao, Tao, and Taihong Wang. "Two-dimensional single crystal CdS nanosheets: synthesis and properties." Crystal Growth & Design 10.11 (2010): 4995-5000.
Prudnikau, Anatol, Andrey Chuvilin, and Mikhail Artemyev. "CdSe CdS Nanoheteroplatelets with Efficient Photoexcitation of Central CdSe Region through Epitaxially Grown CdS Wings." Journal of the American Chemical Society 135.39 (2013): 14476-14479.
Ning, Zhijun, et al. "Role of surface ligands in optical properties of colloidal CdSe/CdS quantum dots." Physical Chemistry Chemical Physics 13.13 (2011): 5848-5854.
Widmer-Cooper, Asaph, and Phillip Geissler. "Orientational ordering of passivating ligands on CdS nanorods in solution generates strong rod—rod interactions." Nano letters 14.1 (2013): 57-65.
Rajendran, Vidyalakshmi, Manfred Lehnig, and Christof M. Niemeyer. "Photocatalytic activity of colloidal CdS nanoparticles with different capping ligands." Journal of Materials Chemistry 19.35 (2009): 6348-6353.
Ma, Nan, Edward H. Sargent, and Shana O. Kelley:. "One-step DNA-programmed growth of luminescent and biofunctionalized nanocrystals." Nature nanotechnology 4.2 (2009): 121-125.
Chen, Su, et al. "Synthesis of Nanocrystal—Polymer Transparent Hybrids via Polyurethane Matrix Grafted onto Functionalized CdS Nanocrystals." Langmuir 23.2 (2007): 850-854.
Li, Xin, et al. "Observation of multiple, identical binding sites in the exchange of carboxylic acid ligands with CdS nanocrystals." Nano letters 14.6 (2014): 3382-3387.
Jang, Woo-Sik, et al. "Dynamics of cadmium sulfide nanoparticles within polystyrene melts." Macromolecules 47.18 (2014): 6483-6490.

(56) References Cited

OTHER PUBLICATIONS

Greytak, Andrew B., et al. "Alternating layer addition approach to CdSe/CdS core/shell quantum dots with near-unity quantum yield and high on-time fractions." Chemical science 3.6 (2012): 2028-2034.

Shunmugam, Raja, and Gregory N. Tew. "Efficient route to well-characterized homo, block, and statistical polymers containing terpyridine in the side chain." Journal of Polymer Science Part A: Polymer Chemistry 43.23 (2005): 5831-5843.

Jackson, R. E., et al. "Groundwater protection and unconventional gas extraction: the critical need for field-based hydrogeological research." Groundwater 51.4 (2013): 488-510.

Seybold, C. A. "Polyacrylamide review: Soil conditioning and environmental fate." Communications in Soil Science & Plant Analysis 25.11-12 (1994): 2171-2185.

Gidley, J. L.; Penny, G. S.; McDaniel, R. R. SPE Prod. Facil. 2013, 10, 20.

Reinicke, Andreas, et al. "Hydraulic fracturing stimulation techniques and formation damage mechanisms—Implications from laboratory testing of tight sandstone—proppant systems." Chemie der Erde-Geochemistry 70 (2010): 107-117.

Benicewicz, Brian C., and Gordon W. Calundann "Shale oil and gas fracturing fluids containing additives of low environmental impact." U.S. Appl. No. 14/043,008.

Zoback, Mark, Saya Kitasei, and Brad Copithorne. Addressing the environmental risks from shale gas development. vol. 21. Washington, DC: Worldwatch Institute, 2010.

Howarth, R. W.; Ingraffea, A.; Engelder, T. Nature 2011, 477, 271.

Myers, Tom. "Potential contaminant pathways from hydraulically fractured shale to aquifers." Groundwater 50.6 (2012): 872-882.

Radhakrishnan, Bindushree, Rajesh Ranjan, and William J. Brittain. "Surface initiated polymerizations from silica nanoparticles." Soft Matter 2.5 (2006): 386-396.

Heikkinen, Jarkko J., Juha P. Heiskanen, and Osmo Eo Hormi. "Grafting of functionalized silica particles with poly (acrylic acid)." Polymers for advanced technologies 17.6 (2006): 426-429.

Ranjan, Rajesh, and William J. Brittain. "Combination of living radical polymerization and click chemistry for surface modification." Macromolecules 40.17 (2007): 6217-6223.

Barner-Kowollik, C. Handbook of RAFT Polymerization; John Wiley & Sons, 2008: p. 245.

Pelet, Jeisa M., and David Putnam, "Poly (acrylic acid) undergoes partial esterification during RAFT synthesis in methanol and interchain disulfide bridging upon NaOH treatment." Macromolecular Chemistry and Physics 213.23 (2012): 2536-2540.

Lai, John T., Debby Filla, and Ronald Shea. "Functional polymers from novel carboxyl-terminated trithiocarbonates as highly efficient RAFT agents." Macromolecules 35.18 (2002): 6754-6756.

Tew, Gregory N., Khaled A. Aamer, and Raja Shunmugam. "Incorporation of terpyridine into the side chain of copolymers to create multi-functional materials." Polymer 46.19 (2005): 8440-8447.

Schroeck, Nicholas J., and Stephanie Karisny. "Hydraulic Fracturing and Water Resource Management in the Great Lakes." (2013).

* cited by examiner

FIG. 1A
Prior Art
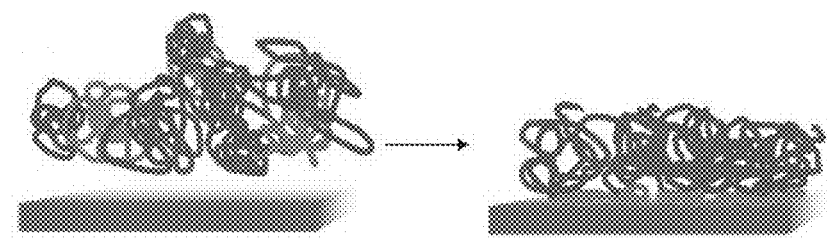
FIG. 1B
Prior Art
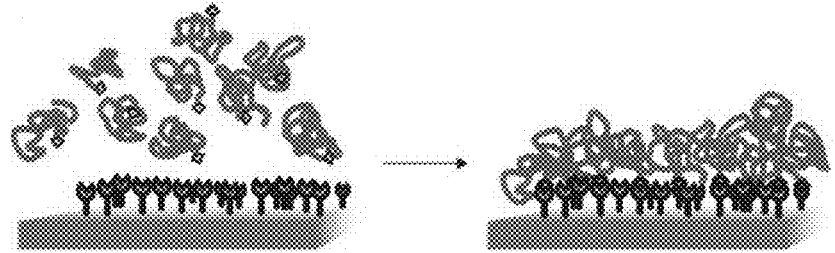
FIG. 1C
Prior Art
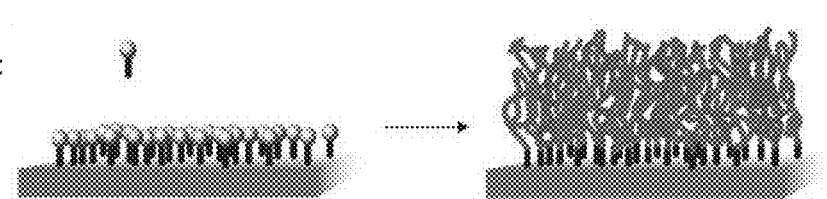
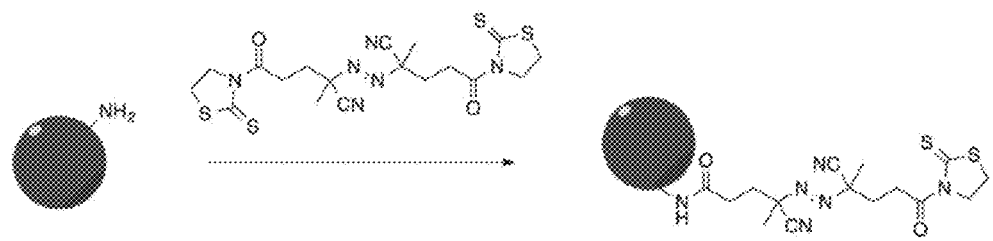
FIG. 2

INITIATOR FOR SURFACE-BASED POLYMERIZATION AND USE THEREOF

CROSS REFERENCE TO RELATED APPLICATION

This application is a divisional application of U.S. patent application Ser. No. 15/373,943 having a filing date of Dec. 9, 2016, now issued as U.S. Pat. No. 10,011,674, which claims filing benefit of U.S. Provisional Patent Application Ser. No. 62/266,290 having a filing date of Dec. 11, 2015, which are incorporated herein by reference in their entirety.

BACKGROUND

In industrial applications involving polymeric materials, the significance of high yields, optimized processes and cost efficiency of the materials cannot be overstated. Typically, industrial polymers are synthesized using condensation, free radical or anionic polymerization methods. When considering applications involving polymers bonded to substrate materials, there are several synthesis methods that are highly effective. The three main methods include physisorption, grafting-to and grafting-from techniques. In physisorption (FIG. 1A), ligands range from weak to strong adsorbents, and typically bind via an electrostatic or hydrogen bonding approach. In the grafting-to approach (FIG. 1B), the substrate is modified with a ligand bearing terminal functionality such that the functionality is available for post-modification. This method is typically utilized for higher yields favouring smaller molecular weight polymers. In the grafting from approach (FIG. 1C), ligands containing chain transfer agents (CTAs) are commonly utilized followed by the growth of polymer chains from the surface. Highly dense brushes can be achieved by this method, as polymer growth is dependent upon the diffusion of monomers to the growing chain end.

One application of interest for industrial polymeric materials is hydraulic fracturing (also commonly referred to as hydrofracking or fracking), which has recently seen a surge in its application to newly minted oil and gas fields. Although the technology has been known for several decades, recent improvements have made it economically feasible to extract oil and gas "horizontally" via fracking, as opposed to the more common vertical drilling. Its adoption is more pronounced in the U.S., where more than 1.1 million active oil and gas wells span across 36 states. There are, however, several concerns and difficulties in oil recovery via fracking and in particular from shale deposits at depths of several thousand feet.

Briefly, the process entails the creation of a hydraulic fracture in the geologic formation through pumping of high viscosity fracturing fluid for a short period (2-3 hours). The resulting high pressure exceeds the rock formation strength and a fracture is created. The pathways thus formed allow the oil in the fractured formations to flow into the wellbore, which enables oil recovery at high rates. Fracturing fluids typically contain a variety of additives that aid in fracture formation, delivery of proppants to the fracture zone and maintenance of good conductivity such that the networks formed do not collapse/clog. Additives include viscosifiers (high molecular weight polymers), biocides, corrosion inhibitors, crosslinkers, friction reducers, gelling agents, scale inhibitors, surfactants and pH control agents. The exact recipe for any fracturing fluid varies depending on the type and depth of the shale formation, borehole geometry, the amount of recoverable gas, etc. However, two main ingredients are a necessity: friction reducers and proppant materials.

Friction exists between the fracturing fluid and the contact surface of the steel pipe and within the water itself (as turbulence) when the fluid is pumped. High pressure can overcome the contact friction, and friction reducers are included to maintain non-turbulent flow. Friction reducers typically include a high molecular weight polyacrylamide polymer. In the presence of water, the polyacrylamide hydrates and its hydrodynamic radius increases, resulting in the prevention of turbulence in the moving water. Polyacrylamides are generally available as a dry powder, and are mixed with a mineral oil base fluid for stabilization prior to addition to the fracturing fluid. The amount of friction reducing materials typically ranges from 0.05-1% by weight of the fracturing fluid mixture.

Proppants are solid materials (generally treated sand or ceramic structures) that aid in keeping the fracture open during the oil recovery operation. The composition and geometry of the proppant can play a large role in maintaining flow of the fluids through the fractures. For instance, untreated sand can cause significant fines to be generated (due to crushing of the sand at high pressure) and may not maintain the fracture as open. There has been a shift toward chemically treated sand as proppant, especially toward formation of treated sand that can be both lightweight (to prevent settling) and high strength (to avoid being crushed).

One issue of concern in fracking is evacuation of the fracturing fluid from the established networks after oil recovery is completed. Once the pressure is released after pumping, about 60% of the fluid returns to the wellbore and can be consequently recovered and reused. However, several thousand gallons of fracturing fluid can remain in the strata following use. These retained fluids can slowly migrate to groundwater sources and/or to the surface, and may pose a significant environmental problem. For instance, polymers of the fracturing fluid (e.g., polyacrylamide friction reducers) may not degrade easily and the monomer units (acrylamide) are often classified as toxic contaminants in groundwater. Hence, it is in the interest of the industry to have solutions that directly address this issue and minimize risk in a cost-effective manner. Typically, established methods involve chemical or thermal decomposition of fracturing fluid remaining in the networks, followed by recovery into the well. However, the cleanup procedures vary between drilling companies, and effective methods of monitoring these steps are uncertain.

Thus, a need exists for materials and methods that can retain polymeric materials in desired locations during and following use. For instance, a need exists for materials and methods that can prevent the migration of polymeric components of fracturing fluids out of established fracture networks after oil recovery is completed.

SUMMARY

Objects and advantages of the invention will be set forth in part in the following description, or may be obvious from the description, or may be learned through practice of the invention.

According to one embodiment, disclosed is a polymerization initiator that can be utilized for surface polymerization. More specifically, an initiator can include an azo-group and first and second anchoring agents on different ends of the azo-group. In one embodiment, the first and second anchoring agents can be identical to one another, but this is not a requirement. In one embodiment, one or both of the anchoring agents can include a thiazoline functionality or a succinimide functionality.

According to another embodiment, disclosed is a particle including the polymerization initiator at a surface thereof. For instance, a particle for use as a proppant, e.g., a treated silica particle or a ceramic particle, can include the polymerization initiator at a surface thereof.

Also disclosed are methods for utilizing the polymerization initiator. For example, a polymer can be provided on the particle surface by use of the initiator. For instance, a polymer as may be utilized as a friction reducer can be adhered according to a "grafting to" or a "grafting from" polymerization scheme at the initiator and the particle can be utilized as a composite proppant/friction reducer in a fracturing fluid.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 1A schematically illustrates a physisorption surface polymerization scheme.

FIG. 1B schematically illustrates a grafting-to surface polymerization scheme.

FIG. 1C schematically illustrates a grafting-from surface polymerization scheme.

FIG. 2 illustrates a reaction scheme for bonding an initiator to a particulate substrate surface.

DETAILED DESCRIPTION

Figure 3:
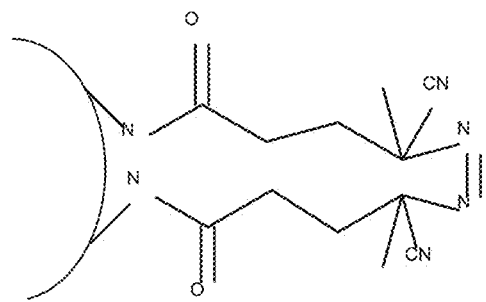
FIG. 3 illustrates an embodiment including both ends of a difunctional initiator bonded to a substrate surface.

Reference now will be made to embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

The present disclosure is generally directed to polymerization initiators as may be utilized for addition of polymers to a substrate surface. More specifically, the initiators are activated azo initiators that include multi-functionality through addition of multiple anchoring agents to an inner azo group. Disclosed initiators can be utilized to polymerize monomers and in one embodiment can provide high density and high molecular weight polymers on a surface such as a particulate surface.

In one particular embodiment, the initiators and polymer/substrate composites formed therefrom can be utilized in addressing concerns such as chemical leakage of polymeric additives in fracturing fluids used in fracking processes. However, it should be understood that the polymerization initiators disclosed herein are in no way limited to such applications By anchoring a polymeric additive of a fracturing fluid to a large substrate (e.g., a proppant particle), migration of the polymer in the rock strata can be hindered. When considering silica based proppant materials, the polymerization initiator can be utilized in development of an optimized proppant in which chemically treated sand can be further modified with a polymeric additive. Beneficially, the polymer functionalized proppant can prevent migration of the polymer through geologic formations and soil to the surface and/or groundwater.

The controlled radical polymerization of poly(acrylic acid) on silica particles has been well documented, but comparative examples with other polymers as may be utilized in fracturing fluid such as poly(acrylamide) are limited. One of the main reasons includes difficulty in handling of the poly(acrylamide), as it is soluble only in water and in select co-solvent mixtures. Beneficially, disclosed polymerization initiators can be designed for polymerization of multiple different polymers, including poly(acrylic acid) and poly(acrylamide) as well as other polymers that can be utilized as components in fracturing fluids. As such, the initiators can have broad applicability in fracking as well as other applications.

In one embodiment, the polymerization initiator can function as a difunctional azo-based free radical initiator. Free radical polymerization provided by use of the initiator can have several advantages, including tolerance to low $O_2$ concentrations, very fast polymerization kinetics and inexpensive initiator compounds. Activation of the initiator can provide multiple anchoring agents (e.g., thiazoline groups) on ends of the initiator, and substitution can be controlled so as to vary depending on the ratio of anchoring functionality on the substrate surface (e.g., amine) to the functionality of the azo-based polymerization initiator. For instance, when the ratio of surface anchoring functionality to initiator functionality is large, e.g., greater than 1 or about 2 or greater, multiple anchoring ends of a single initiator (or of multiple initiators) can be bonded to the surface via the anchoring moiety of the surface. This can lead to higher density of surface polymer, as each azo group of an initiator can provide two radicals upon decomposition of the azo group via, e.g., heating, each of which can initiate polymerization. In cases where the ratio of surface anchoring functionality to anchoring functionality of the initiator is less, e.g., about 1 or less, fewer anchoring ends of the initiator will bond to the surface, and thus fewer polymers will develop at the substrate surface. For example, if both ends of a difunctional initiator are anchored, the azo group initiator can encourage a polymer growth scheme carried out from the radical at each separately bonded end, developing two polymers from the substrate surface. In contrast, if only a single end of a difunctional initiator is anchored, only a single polymer growth scheme will be carried out from the single radical of the anchored initiator.

Activated azo polymerization initiators can be utilized in one embodiment to generate high molecular weight polymers (e.g., 800 kDa or greater number average molecular weight in some embodiments) in a short period of time. Such high molecular weight polymeric additives can be of use in a variety of applications and in one particular embodiment in fracturing fluids, for instance as surface bonded viscosity modifiers such as poly(acrylamide) that can be retained in the fracture network as a composite proppant/polymer construct.

The polymerization initiator can have the general structure as follows:

$A_1$ and $A_2$ of the polymerization initiator can be the same as or different from one another and are attachment groups that can include the general formula:

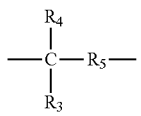

in which $R_3$ and $R_4$ can be independently H, CN, $CH_3$, $COOR_6$ ($R_6$=H, alkyl, e.g., C1 to C10 alkyl), $C_2H_5$, etc.; and $R_5$ can be a bond or an alkyl group, e.g., C1 to C10 alkyl.

$R_1$ and $R_2$ of the polymerization initiator can be the same as or different from one another and can include any suitable linkage group such as, without limitation, a carbonyl-containing linkage (e.g., ketone linkage, ester linkage, amide linkage, acid anhydride linkage, imide linkage, etc.), an amine-containing linkage (e.g., amide groups, azide groups, cyanate groups; nitrate groups, nitrite groups, etc.), a thiol-containing linkage (e.g., sulfinic acid, sulfonic acid, thiocyanates, etc.), a phosphonate linkage, an epoxy linkage, alkene-containing linkage, and so forth. Optionally, $R_1$ and/or $R_2$ can be a bond.

$X_1$ and $X_2$ of the polymerization initiator can be the same as or different from one another and can include any anchoring agent as is generally known in the art. One or both of the anchoring agents can be attached to a surface for subsequent attachment of polymeric chains (e.g., via a "grafting-from" or "grafting-to" approach, as described in greater detail below) via a radical of the polymerization initiator. One or both of the anchoring agents can be covalently bonded to a substrate surface, either directly or via a functionalization group. The particular anchoring agent(s) can be selected based upon the type of surface (e.g., a proppant nanoparticle) and/or the type of polymeric chain(s) to be attached thereto.

In forming the polymerization initiator, the anchoring agent(s) can be reacted with an azo-containing compound. As such, the anchoring agent(s) can have a functional group for reaction, reaction of which can provide the linkage group of the polymerization initiator. Suitable functional groups can depend upon the particular azo compound and can include, but are not limited to, amine groups (e.g., amide groups, azide groups, cyanate groups; nitrate groups, nitrite groups, etc.), thiol groups (e.g., sulfinic acid, sulfonic acid, thiocyanates, etc.), phosphonate groups, hydroxyl groups (e.g., —OH), carboxylic acid groups (e.g., —COOH), aldehyde groups (e.g., —CHO), halogen groups (e.g., haloalkanes, haloformyls, etc.), epoxy groups, alkenes, alkynes, and the like.

For example, in one embodiment, a mercaptothiazoline anchoring agent can be reacted with an azo-containing compound such as 4,4'-Azobis(4-cyanovaleric acid), a commercially available free radical initiator, at both of its carboxylic acid functional groups to form the polymerization initiator per the following reaction scheme:

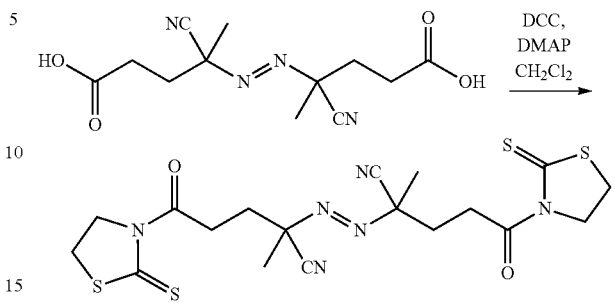

Other anchoring agents as may be reacted with an azo-containing group to form the polymerization initiator can include anchoring agents as are known in the art. For instance, in one embodiment, 4-cyanopentanoic acid dithiobenzoate (CPDB) can be reacted at one or both ends of a difunctional azo-containing compound to form the polymerization initiator. The CPDB end(s) of the polymerization initiator can then be attached to an amine-functionalized substrate surface by activating the ends using, e.g., 2-mercaptothiazoline. The polymerization initiator can then be immobilized onto the surface via a condensation reaction with the amine groups on the substrate surface.

In one embodiment, the polymerization initiator can have the following structure:

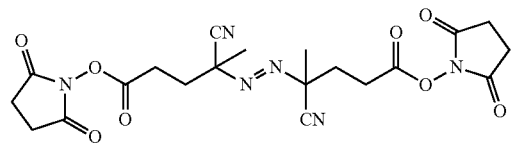 [SMILES: CC(C#N)(CCC(=O)ON1C(=O)CCC1=O)/N=N/C(C)(C#N)CCC(=O)ON1C(=O)CCC1=O]

It should be understood that the anchoring agent for use in forming the polymerization initiator is not limited to thiazoline-containing agents, and other compounds are encompassed herein. For example, the anchoring agent component can include succinimide reactivity in one embodiment. For instance, N-hydroxysuccinimide (NHS) can be reacted with an azo-containing compound such as 4,4'-Azobis(4-cyanovaleric acid) to form a polymerization initiator.

Following formation, the polymerization initiator can be immobilized onto a surface (e.g., colloidal silica nanoparticles), for instance via the thiazoline groups of the above scheme. For instance, the dual functionalized polymerization initiator can be attached on the surface by first functionalizing the surface with amine groups using, e.g., 3-aminopropyldimethylethoxysilane. Use of a mono-functional silane such as 3-aminopropyldimethylethoxysilane is not required, but it may be beneficial in some embodiments as use of such as compared to a trifunctional silane can ensure the formation of a monolayer of initiator on the surface and can prevent particle agglomeration by crosslinking during processing.

As mentioned previously, the ratio of the surface anchoring sites to polymerization initiator can be useful in determining the grafting density. Thus, the concentration of surface anchoring sites can be adjusted as desired, e.g., by varying the concentration of amino-silane. Addition of a small amount of an inert dimethylmethoxy-n-octylsilane can optionally be utilized to partially cover the surface by inert alkyl groups and can help to tune the grafting density along with preventing aggregation of substrate particles.

The attachment scheme utilized to bond the polymerization initiator onto an amine-functionalized surface can depend upon the anchoring agent used in forming the initiator. For instance, when considering a thiazoline compound such as the mercaptothiazoline described above, the initiator can be immobilized on the surface via a condensation reaction with amine groups present on the surface as illustrated in the reaction scheme of FIG. 2. Of course, the polymerization initiator can be activated as necessary for the immobilization reaction according to any suitable reaction chemistry.

As previously stated, in those embodiments in which the surface includes a high concentration of anchoring sites relative to the amount of the polymerization initiator, the initiator can react with the anchoring sites at both ends of the difunctional initiator. For instance, when considering the thiazoline-functionalized azo-containing polymerization initiator illustrated above, the polymerization initiator can bind a surface at two sites as illustrated in FIG. 3.

In this embodiment, the single initiator can be utilized to provide two nitrogen radicals and as such two polymers at the surface, which can provide a surface with a high polymer density.

The polymerization initiator can be utilized on a variety of different types of surfaces. In one particular embodiment, the polymerization initiator can be utilized in conjunction with particles. The particle may comprise, for example, natural or synthetic clays (including those made from amorphous or structured clays), inorganic metal oxides (e.g., silica, alumina, and the like), latexes, organic particles, etc. Particularly suitable particles include inorganic particles, such as silica, alumina, titania ($TiO_2$), indium tin oxide (ITO), CdSe, etc., or mixtures thereof. Suitable organic particles include polymer particles, carbon, graphite, graphene, carbon nanotubes, virus nanoparticles, etc., or mixtures thereof. The particles can be micro-scale particles or nano-scale particles.

In one particular embodiment, the polymerization initiator can be applied to a surface of a proppant particulate substrate as may be utilized in a fracking process. Proppant particulate substrates can include, without limitation, graded sand, resin coated sand, bauxite, ceramic materials, glass materials, walnut hulls, polymeric materials, resinous materials, rubber materials, and the like, and combinations thereof. A particulate surface can include specialty proppants, such as ceramics, bauxite, and resin coated sand.

Combinations of different types of particles are also encompassed. For instance, by combining sand with a specialty proppant, a proppant injection can have desirable strength, permeability, suspension, and transport properties.

In some embodiments, the substrates can include naturally occurring materials, for example nutshells that have been chipped, ground, pulverized or crushed to a suitable size (e.g., walnut, pecan, coconut, almond, ivory nut, brazil nut, and the like), or for example seed shells or fruit pits that have been chipped, ground, pulverized or crushed to a suitable size (e.g., plum, olive, peach, cherry, apricot, etc.), or for example chipped, ground, pulverized or crushed materials from other plants such as corn cobs. In some embodiments, the substrates can be derived from wood or processed wood, including but not limited to woods such as oak, hickory, walnut, mahogany, poplar, and the like. In some embodiments, aggregates can be formed, using an inorganic material joined or bonded to an organic material. In general, the proppant particulate substrates can be comprised of particles (whether individual substances or aggregates of two or more substances) having a size in the order of mesh size 4 to 100 (US Standard Sieve numbers). As used herein, the term "particulate" includes all known shapes of materials without limitation, such as spherical materials, elongate materials, polygonal materials, fibrous materials, irregular materials, and any mixture thereof.

In some embodiments, the particulate substrate can be formed as a composite from a binder and a filler material. Suitable filler materials can include inorganic materials such as solid glass, glass microspheres, fly ash, silica, alumina, fumed carbon, carbon black, graphite, mica, boron, zirconia, talc, kaolin, titanium dioxide, calcium silicate, and the like. In certain embodiments, a proppant particulate substrate can be reinforced to increase resistance to the high pressure of the formation which could otherwise crush or deform the particles. Reinforcing materials can be selected from those materials that are able to add structural strength to the proppant particulate substrate, for example high strength particles such as ceramic, metal, glass, sand, and the like, or any other materials capable of being combined with another particulate substrate to provide it with additional strength.

In certain embodiments, the proppant particulate substrate can be fabricated as an aggregate of two or more different materials providing different properties. For example, a core particulate substrate having high compression strength can be combined with a buoyant material having a lower density than the high compression-strength material. The combination of these two materials as an aggregate can provide a core particle having an appropriate amount of strength, while overall having a relatively lower density. As a lower density particle, a particle can be suspended in a less viscous fracturing fluid, allowing the fracturing fluid to be pumped more easily, and allowing more dispersion of the proppants within the formation as they are propelled by the less viscous fluid into more distal regions. High density materials used as proppant particulate substrates, such as sand, ceramics, bauxite, and the like, can be combined with lower density materials such as hollow glass particles, other hollow core particles, certain polymeric materials, and naturally-occurring materials (nut shells, seed shells, fruit pits, woods, or other naturally occurring materials that have been chipped, ground, pulverized or crushed), yielding a less dense aggregate that still possesses adequate compression strength.

Aggregates suitable for use as proppant particulate substrates can be formed using techniques to attach the two components to each other. As one preparation method, a proppant particulate substrate can be mixed with the buoyant material having a particle size similar to the size of the proppant particulate substrates. The two types of particles can then be mixed together and bound by an adhesive, such as a wax, a phenol-formaldehyde novolac resin, etc., so that a population of doublet aggregate particles are formed, one subpopulation having a proppant particulate substrate attached to another similar particle, one subpopulation having a proppant particulate substrate attached to a buoyant particle, and one subpopulation having a buoyant particle attached to another buoyant particle. The three subpopulations could be separated by their difference in density: the first subpopulation would sink in water, the second subpopulation would remain suspended in the liquid, and the third subpopulation would float.

In other embodiments, a proppant particulate substrate can be engineered so that it is less dense by covering the surface of the particulate substrate with a foamy material.

The thickness of the foamy material can be designed to yield a composite that is effectively neutrally buoyant. To produce such a coated proppant particulate, a particle having a desirable compression strength can be coated with one reactant for a foaming reaction, followed by exposure to the other reactant. With the triggering of foam formation, a foam-coated proppant particulate will be produced. The polymerization initiator can then be adhered to the coating of the particulate.

As an example, a water-blown polyurethane foam can be used to provide a coating around the particles that would lower the overall particle density. To make such a coated particle, the particle can be initially coated with Reactant A, for example a mixture of one or more polyols with a suitable catalyst (e.g., an amine). This particle can then be exposed to Reactant B containing a diisocyanate. The final foam will form on the particle, for example when it is treated with steam while being shaken; the agitation will prevent the particles from agglomerating as the foam forms on their surfaces.

In one embodiment, a particulate substrate can have an average particle size of about 1 to about 1000 nanometers, or 2 to about 750 nanometers in some embodiments. That is, the nanoparticles have a dimension (e.g., a diameter or length) of about 1 to 1000 nm. Nanotubes can include structures up to 1 centimeter long, alternatively with a particle size from about 2 to about 50 nanometers.

A particulate substrate may be crystalline or amorphous. A single type of particle may be used, or mixtures of different types of particles may be used. Non-limiting examples of suitable particle size distributions of nanoparticles are those within the range of about 2 nm to less than about 750 nm, alternatively from about 2 nm to less than about 200 nm, and alternatively from about 2 nm to less than about 150 nm.

It should also be understood that certain particle size distributions may be useful to provide certain benefits, and other ranges of particle size distributions may be useful to provide other benefits (for instance, color enhancement requires a different particle size range than the other properties). The average particle size of a batch of particles may differ from the particle size distribution of those particles. For example, a layered synthetic silicate can have an average particle size of about 25 nanometers while its particle size distribution can generally vary between about 10 nm to about 40 nm.

In one embodiment, a particulate substrate can be exfoliated from a starting material to form the particles. Such starting material may have an average size of up to about 50 microns (50,000 nanometers). In another embodiment, the nanoparticles can be grown to the desired average particle size.

In general either of two methods can be utilized to form polymeric chains extending from the composite including the substrate and the polymerization initiator: a "grafting-from" approach of a "grafting-to" approach.

"Grafting-From" Methods

In one embodiment, the polymeric chain can be formed by polymerizing a first plurality of first monomers on the polymerization initiator, resulting in the first polymeric chain being covalently bonded to the substrate via the initiator including the anchoring compound. According to this method, the polymerization of the polymeric chain can be conducted through any suitable type of free radical polymerization, such as reversible addition-fragmentation chain transfer (RAFT) polymerization, atom transfer radical polymerization (ATRP), etc.

The particular types of monomer(s) and/or polymerization technique can be selected based upon the desired polymeric chain to be formed. For example, for RAFT polymerization, monomers containing acrylate, methacrylate groups, acrylamides, styrenics, etc., are particularly suitable for formation of the polymeric chain.

Thus, the "grafting-from" method involves formation of the polymeric chain onto the substrate surface via the anchoring compound of the polymerization initiator and results in the polymeric chain being covalently bonded to the nanoparticle via the anchoring compound.

"Grafting-To" Methods

In one embodiment, the polymeric chain can be first polymerized and subsequently covalently bonded to the surface of the nanoparticle via the polymerization initiator. In this embodiment, the polymeric chain is not limited to the types of monomer(s) capable of being polymerized directly to the polymerization initiator. As such, as long as the polymeric chain defines a functional group that can react and bond to the polymerization initiator, e.g., via the nitrogen radical of the polymerization initiator, any polymeric chain can be bonded to the nanoparticle.

In one embodiment, upon attachment, the polymeric chain can be deactivated to prevent further polymerization thereon. For example, if the "grafting-from" method is utilized to attach the polymeric chain to the surface via polymerization through a controlled living polymerization (CLP) technique (e.g., RAFT), a deactivation agent can be utilized, e.g., attached to the end of each polymeric chain, to inhibit further polymerization thereon. The deactivation agents can be selected based upon the type of polymerization and/or the type(s) of monomers utilized, but can generally include but are not limited to amines, peroxides, or mixtures thereof.

On the other hand, if the "grafting-to" method is utilized to attach the polymeric chain to the surface via attaching a pre-formed first polymeric chain, the polymeric chain can be deactivated either prior to or after covalently bonding the polymeric chain to the polymerization initiator. For instance, an active polymerization end of the polymeric chain can be deactivated prior to covalently bonding a second end of the polymeric chain to the surface.

The deactivation of the polymeric chain can be achieved by any suitable process. In one embodiment, the polymer chain can be cleaved. Alternatively, the end of the polymer chain can be functionally deactivated. For example, when formed via RAFT polymerization, the types of reactions that can be used to convert RAFT agents to deactivated end groups include reactions with diazo compounds, reactions with nucleophilic reagents such as primary amines, and reactions with oxidation agents which cleave the RAFT agent off the chain end and form an oxidized sulfur group such as sulfonic acid.

As mentioned, the polymeric chain(s) can be formed via a grafting to approach in a controlled polymerizations, such as controlled living polymerizations (CLPs) or controlled ring-opening polymerizations, which may be independently selected based upon the particular anchoring agent(s)/initiators present on the surface, type of monomer(s) used to form the polymeric chain, and/or desired properties of the polymeric chains formed. Through the use of these controlled polymerizations, each polymeric chain can be produced with desired polydispersity and architecture.

Controlled living polymerization generally refers to chain growth polymerization which proceeds with significantly suppressed termination or chain transfer steps. Thus, polymerization in CLP proceeds until all monomer units have been consumed or until the reaction is terminated (e.g., through quenching and/or deactivating), and the addition of monomer results in continued polymerization, making CLP ideal for block polymer and graft polymer synthesis. The molecular weight of the resulting polymer is generally a linear function of conversion so that the polymeric chains are initiated and grow substantially uniformly. Thus, CLPs provide precise control on molecular structures, functionality and compositions. Thus, these polymers can be tuned with desirable compositions and architectures.

Controlled living polymerizations and controlled ring-opening polymerizations are generally known to those skilled in the art. A brief general description of each technique is below, and is provided for further understanding of the present invention, and is not intended to be limiting:

RAFT Polymerization

As previously mentioned, RAFT polymerization (RAFT) is one type of controlled radical polymerization as may be carried out by use of the polymerization initiators. RAFT polymerization uses thiocarbonylthio compounds, such as dithioesters, dithiocarbamates, trithiocarbonates, and xanthates, in order to mediate the polymerization via a reversible chain-transfer process. RAFT agents are generally thiocarbonylthio compounds, such as generally shown below:

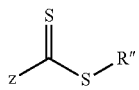

in which the z group primarily stabilizes radical species added to the C=S bond and the R group is a good homolytic leaving group. For example, the z group can be an aryl group (e.g., phenyl group, benzyl group, etc.), an alkyl group, etc. The R" group can be an organic chain terminating with a carboxylic acid group.

RAFT polymerization can be performed by simply adding a chosen quantity of appropriate RAFT agents to the free radical polymerization. RAFT polymerization is particularly useful with monomers having a vinyl functional group (e.g., a (meth)acrylate group).

Typically, a RAFT polymerization system includes the monomer, the initiator, and a RAFT agent (also referred to as a chain transfer agent). Because of the low concentration of the RAFT agent in the system, the concentration of the initiator can be lower than in conventional radical polymerization.

RAFT is a type of living polymerization involving a conventional radical polymerization in the presence of the chain transfer reagent. Like other living radical polymerizations, there is minimized termination step in the RAFT process. The reaction is started by the radical initiator (e.g., a nitrogen radical of the disclosed initiators). In this initiation step, the initiator reacts with a monomer unit to create a radical species which starts an active polymerizing chain. Then, the active chain reacts with the thiocarbonylthio compound of the RAFT agent, which kicks out the homolytic leaving group (R"). This is a reversible step, with an intermediate species capable of losing either the leaving group (R") or the active species. The leaving group radical then reacts with another monomer species, starting another active polymer chain. This active chain is then able to go through the addition-fragmentation or equilibration steps. The equilibration keeps the majority of the active propagating species into the dormant thiocarbonyl compound, limiting the possibility of chain termination. Thus, active polymer chains are in equilibrium between the active and dormant species. While one polymer chain is in the dormant stage (bound to the thiocarbonyl compound), the other is active in polymerization.

By controlling the concentration of initiator and thiocarbonylthio compound and/or the ratio of monomer to thiocarbonylthio compound, the molecular weight of the polymeric chains can be controlled with low polydispersities.

Depending on the target molecular weight of final polymers, the monomer to RAFT agent ratios can range from about less than about 10 to more than about 1000 (e.g., about 10 to about 1,000). Other reaction parameters can be varied to control the molecular weight of the final polymers, such as solvent selection, reaction temperature, and reaction time. For instance, solvents can include conventional organic solvents such as tetrahydrofuran, toluene, dimethylformamide, anisole, acetonitrile, dichloromethane, etc. The reaction temperature can range from room temperature (e.g., about 20° C.) to about 120° C. The reaction time can be from less than about 1 h to about 48 h.

The RAFT process allows the synthesis of polymers with specific macromolecular architectures such as block, gradient, statistical, comb/brush, star, hyperbranched, and network copolymers (see, e.g., U.S. Pat. No. 8,865,796 and U.S. Patent Application Publication Nos. 2015/0266990, 2015,0073109, and 2014/0090850, all of which are incorporated herein by reference thereto.)

Atom Transfer Radical Polymerization

Atom transfer radical polymerization (ATRP) is another example of a living radical polymerization as may be carried out by use of the disclosed polymerization inititators. The control is achieved through an activation-deactivation process, in which most of the reaction species are in dormant format, thus significantly reducing chain termination reaction. The four major components of ATRP include the monomer, initiator, ligand, and catalyst. ATRP is particularly useful monomers having a vinyl functional group (e.g., a (meth)acrylate group).

The catalyst can determine the equilibrium constant between the active and dormant species during polymerization, leading to control of the polymerization rate and the equilibrium constant. In one particular embodiment, the catalyst is a metal having two accessible oxidation states that are separated by one electron, and a reasonable affinity for halogens. One particularly suitable metal catalyst for ATRP is copper (I).

The ligands can be, e.g., linear amines or pyridine-based amines.

Depending on the target molecular weight of final polymers, the monomer to initiator ratios can range from less than about 10 to more than about 1,000 (e.g., about 10 to about 1,000). Other reaction parameters can be varied to control the molecular weight of the final polymers, such as solvent selection, reaction temperature, and reaction time. For instance, solvents can include conventional organic solvents such as tetrahydrofuran, toluene, dimethylformamide, anisole, acetonitrile, dichloromethane, etc. The reaction temperature can range from room temperature (e.g., about 20° C.) to about 120° C. The reaction time can be from less than about 1 h to about 48 h.

Ring-Opening Metathesis Polymerization

Ring-opening metathesis polymerization (ROMP) is a type of olefin metathesis polymerization. The driving force of the reaction is relief of ring strain in cyclic olefins (e.g. norbornene or cyclopentene) in the presence of a catalyst.

The catalysts used in a ROMP reaction can include a wide variety of metals and range from a simple $RuCl_3$/alcohol mixture to Grubbs' catalyst.

The monomer can include a strained ring functional group, such as a norbornene functional group, a cyclopentene functional group, etc. to form the polymeric chains. For example, norbornene is a bridged cyclic hydrocarbon that has a cyclohexene ring bridged with a methylene group in the para position.

The ROMP catalytic cycle generally requires a strained cyclic structure because the driving force of the reaction is relief of ring strain. After formation of the metal-carbene species, the carbene attacks the double bond in the ring structure forming a highly strained metallacyclobutane intermediate. The ring then opens giving the beginning of the polymer: a linear chain double bonded to the metal with a terminal double bond as well. The new carbene reacts with the double bond on the next monomer, thus propagating the reaction.

Ring-Opening Polymerization

In one particular embodiment, where the monomer includes a strained ring function group (e.g., a caprolactone or lactide), ring-opening polymerization (ROP) may be used to form the polymeric chain. For example, a caprolcatone-substituted monomer is a polymerizable ester, which can undergo polymerization with the aid of the initiator and a tin-based reagent as a catalyst.

Examples

Mercatotiazoline-activated ACVA was formed. 4,4'-Azo-bis(4-cyanovaleric acid) (20 g, 35.679 mmol) was dissolved in 400 ml of 1,4-dioxane in a 1000 ml round bottom flask. 2-Mercaptothiazoline (22.58 g, 188.38 mmol) and 4-dimethyl aminopyridine (0.5 g, 4.07 mmol) were added and the mixture was stirred until complete dissolution of the mixture was observed. The mixture was cooled to 0° C., and in a separate 500 ml beaker, N,N'-dicyclohexylcarbodiimide (34 g, 164.84 mmol) was stirred in 100 ml of 1,4-dioxane until a cloudy suspension was observed. The carbodiimide solution was added dropwise to the mixture in the round bottom flask at 0° C. via an addition funnel. The mixture was stirred overnight, and then filtered, followed by removal of the solvent through rotary evaporation. The yellow solid was then purified through recrystallization in a 70% hexane/ethyl acetate mixture (31.5 g, 91.6% yield). $^1$H-NMR (300 MHz, $CDCl_3$): δ (ppm) 4.59 (t, 2H), 3.30 (t, 2H), 3.12-3.63 (m, 2H), 2.41-2.64 (m, 2H), 1.75 (s, 3H).

NHS-activated ACVA was formed. 4,4'-Azobis(4-cyanovaleric acid) (5 g, 17.84 mmol) was dissolved in 100 ml of THF in a 500 ml round bottom flask. N-hydroxysuccinimide (4.93 g, 42.81 mmol) and 4-dimethyl aminopyridine (0.4 g, 3.56 mmol) were added and the mixture was stirred until complete dissolution of the mixture was observed. The mixture was cooled to 0° C., and in a separate 500 ml beaker, N,N'-dicyclohexylcarbodiimide (8.8 g, 42.81 mmol) was stirred in 50 ml of THF until a cloudy suspension was observed. The carbodiimide solution was added dropwise to the mixture in the round bottom flask at 0° C. via an addition funnel. The mixture was stirred over night, and then filtered, followed by removal of the solvent through rotary evaporation. The yellow solid was then purified through recrystallization in a 70% hexane/ethyl acetate mixture (7.60 g, 90% yield). $^1$H-NMR (300 MHz, $CDCl_3$): δ (ppm), 3.12-3.63 (m, 2H), 2.7 (t, 4H), 2.41-2.64 (m, 2H), 1.75 (s, 3H).

Amino functionalized syloid particles were formed. A THF solution (50 mL) of bare syloid particles (0.5 g) was mixed in a 200 ml round bottom flask and stirred for 10 min. 3-Aminopropylsilane (50 µl, 0.265 mmol) was added to the mixture and the flask was equipped to a condenser and purged with $N_2$. The mixture was refluxed overnight under $N_2$. The mixture was diluted with 100 ml of THF and then centrifuged at 3000 rpm for 5 min. The particles were isolated and suspended in 50 ml of THF. The centrifugation-redispersion process was repeated two more times, and in the final step, the isolated particles were stored as a dichloromethane (DCM) solution (20 ml).

Activated ACVA (0.128 g, 0.266 mmol) was dissolved in THF (7 ml) added to the amino functionalized syloid in DCM (20 ml) at 0° C. After complete addition, the solution was stirred over night at room temperature under nitrogen. The reaction mixture was then diluted into a large amount of THF (100 mL). The particles were recovered by centrifugation at 3000 rpm for 15 min. The particles were then resuspended in 100 mL of THF. This centrifugation-dilution procedure was repeated another two times until the supernatant layer after centrifugation was colorless. The yellow azo functionalized syloid particles were then dried in the oven for 1 h, and then stored in the freezer in an air-tight container.

In a dried Schlenk tube, azo anchored syloid (0.05 g) was dissolved in THF (2 mL). Methyl methacrylate (MMA) (2 mL) was then added to the tube. The mixture was degassed by three freeze-pump-thaw cycles, back filled with nitrogen, and then placed in an oil bath preset at 65° C. The polymerization was quenched by submersion of the reaction vessel in ice water. The polymer solution was precipitated into hexanes, and redispersed in THF. The precipitation-redispersion process was repeated once more to obtain poly (methyl methacrylate) functionalized syloid.

For the polymerization of styrene, the above reaction was used with the same ratio of reactants, but MMA was substituted with styrene (2 mL). The polymer solution was precipitated into methanol, and redispersed in THF. The precipitation-redispersion process was repeated once more to obtain poly(styrene) (PSt) functionalized syloid. The polymer functionalized syloid was then subjected to cleavage of the polymers according to the procedure in 5.2.10. GPC analysis of the cleaved PMMA provided Mn: 342 k, PDI: 2.12 and that of the cleaved PSt with Mn: 681 k, PDI: 2.81.

Filter columns were made with a plug of cotton, sand (1 mm) and filter material (4 cm) in a Fisherbrand™ Disposable Borosilicate Glass Pasteur Pipette (length: 5.75 in., 146 mm). Filter materials used include Syloid particles, silica gel (70-200 um), and diatomaceous earth. A typical method involved the dissolution of the sample (14-78 mg) in water (1 ml) and its addition to the column to be filtered into a vial. The vial was then freeze-dried to calculate the mass of its contents. All experiments involved three sets of samples including the control (1 ml of water), free polymer (for PAA, Mn: 1800 g/mol) and Syloid-polymer. Retention efficiencies were calculated based on the amount of Syloid-polymer and free polymer had passed through the column compared to the original amounts of each used. A retention efficiency of 0% for the free polymer indicated that all of the free polymer had passed through the column. Conversely, a retention efficiency of 100% for the Syloid-polymer indicated that none of the Syloid-polymer had passed through the column. All filtration tests were accompanied with a control test, where water (1 mL) was passed through the same mass of the filter material in a separate piptette. As some of the filter material managed to pass through the cotton plug, the mass of the filter material in the vial (after freeze-drying) was calculated and compared with the run with syloid-polymer/polymer. This control test was used to recalculate an adjusted retention efficiency, which accounts for any filter material that passes through the cotton plug.

In order to simulate real world conditions, extended washing procedures were tested to see the retention efficiency after several additions of water to the column. In this procedure, samples were dissolved in water (2 mL), passed through the column, and followed up with two separate additions of water (1 mL) each. Similar to the procedure outlined above, each experiment included a control (2 mL of water), and the free polymer and syloid-polymer respectively.

In order to further test the proof of concept for the free radical polymerization, several polymerizations were performed with styrene and methyl methacrylate without the presence of any free initiator (Table 1, below). In all cases where the ratio of monomer to solvent was 1:1 (mL), the polymerization proceeded very quickly and gelled composites were obtained. The composites were dissolved in THF and then subject to HF to cleave the polymers for analysis by GPC. GPC traces revealed high MW polymers and high polydispersities (2.12-2.81), both relating to the uncontrolled characteristics of the free radical polymerization.

TABLE 1

| Syloid-azo (g) | Monomer | Time (h) | Mn (GPC) | PDI |
|---|---|---|---|---|
| 0.05 | MMA (2 mL) | 2.22 | 342k | 2.12 |
| 0.05 | Styrene (2 mL) | 2.1 | 681k | 2.81 |

Surface initiated free radical polymerizations of water soluble polyacrylamide were performed in aqueous conditions. In a 1,000 ml 3-neck round bottom flask, ACVA functionalized syloid particles (0.5 g) were suspended in 600 ml DI water. The suspension was sparged with a large flow of $N_2$ for 30 minutes before adding acrylamide in varying amounts. The solution was heated to 80° C. and stirred for 24 hours. The solution was allowed to cool to room temperature before recovering the PAM grafted particles by centrifuging at 3,000 rpm for five minutes. The particles were then suspended back into water and recovered two more times. Content of surface polymer was measured using thermogravimetric analysis (TGA). Table 2, below shows the percent weight loss of samples polymerized with varying monomer to grafted initiator ratios.

TABLE 2

| Sample | Equivalents of acrylamide to initiator | % wt loss at 800° C. |
|---|---|---|
| Bare Syloid | NA | 3 |
| Syloid-ACVA | NA | 13 |
| MHB2-198 | 204 | 12 |
| MHB2-202 | 1019 | 28 |
| MHB2-205 | 1631 | 35 |

Figure 4:
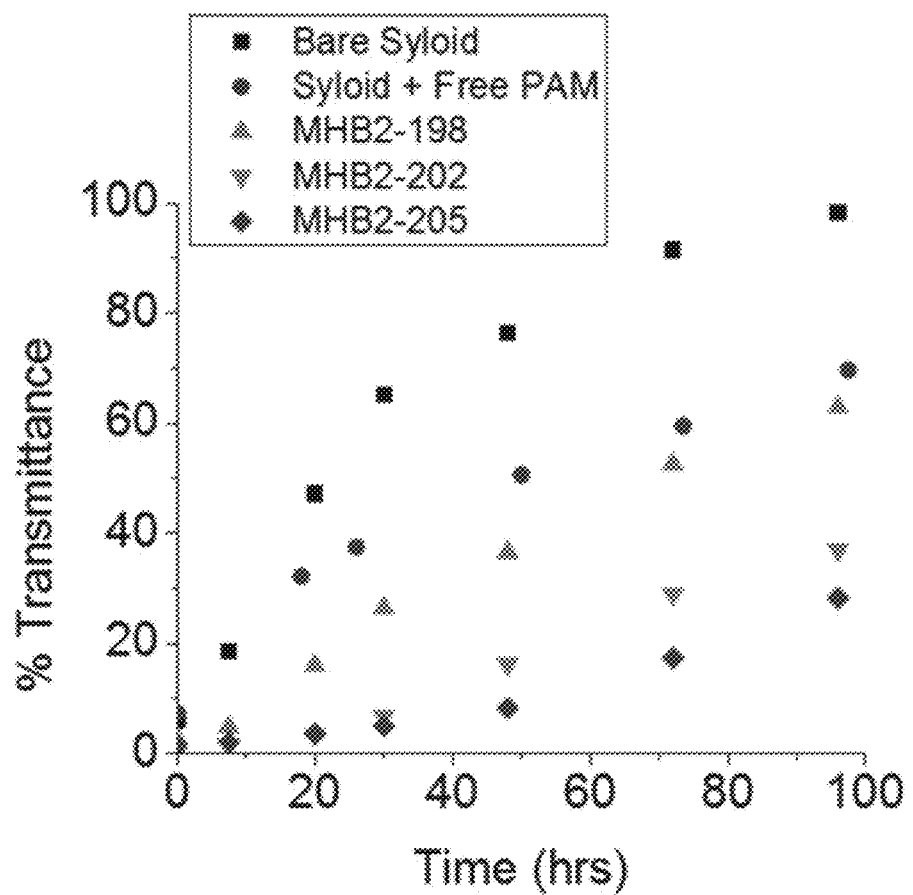
FIG. 4 graphically presents the optical transmittance of particulate dispersions comparing syloid particles grafted with various densities of polyacrylamide.

To test the efficacy of suspending polymer grafted particles in aqueous conditions, experiments were performed to measure the relative amount of particles in solution over time. Syloid (100 mg) was diluted into 20 ml water yielding a 5 mg/ml Syloid in water solution for each sample. Syloid loading of PAM grafted particles was determined through TGA analysis. For preparation of free PAM+bare Syloid solution, a portion of free polymer recovered from MHB2-205 was dried before combining the free polymer (25 wt %) and bare Syloid (100 mg) in 20 ml water to make the resulting Syloid+bare PAM solution. The samples were sonicated for 20 minutes before transferring an aliquot of each sample to a polystyrene cuvette. A lid was placed on the cuvette and sealed in place with parafilm. Transmittance at 300 nm was measured immediately (t=0) then again at timed intervals for 100 hours. A plot of time vs. transmittance is shown in FIG. 4.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole and in part. Furthermore, those of ordinary skill in the art will appreciate that the foregoing description is by way of example only, and is not intended to limit the invention so further described in the appended claims.

What is claimed:

1. A composite particle comprising a polymerization initiator bonded to a surface of a particle, the polymerization initiator comprising an azo-group comprising a first and second end, a first anchoring agent and a second anchoring agent, the first and second anchoring agents being bonded to the first and second ends, respectively, of the azo-group, at least one of the first and second anchoring agents being bonded to the surface of the particle.

2. The composite particle of claim 1, the polymerization initiator having the general structure of:

in which
A$_1$ and A$_2$ are the same as or different from one another and each comprise an attachment group,
R$_1$ and R$_2$ are the same as or different from one another and each comprise a linkage group,
X$_1$ and X$_2$ are the same as or different from one another and each comprise the first and second anchoring agents, respectively.

3. The composite particle of claim 2, wherein A$_1$ and A$_2$ have the general structure:

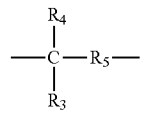

in which
R$_3$ and R$_4$ independently comprise H, CN, CH$_3$, COOR$_6$ (R$_6$=H or alkyl), or C$_2$H$_5$; and
R$_5$ is an alkyl group.

4. The composite particle of claim 2, wherein R$_1$ and R$_2$ independently comprise a carbonyl-containing linkage, an amine-containing linkage, a thiol-containing linkage, a phosphonate linkage, an epoxy linkage, an alkene-containing linkage, or are a bond.

5. The composite particle of claim 2, wherein X$_1$ and X$_2$ each independently comprise a thiol group, a phosphonate group, or a halogen.

6. The composite particle of claim 1, wherein at least one of the first and second anchoring agents are bonded to the surface via thiozoline reactivity.

7. The composite particle of claim 1, wherein at least one of the first and second anchoring agents are bonded to the surface via succinimide reactivity.

8. The composite particle of claim 1, wherein both the first and second anchoring agents are bonded to the surface of the particle.

9. The composite particle of claim 1, wherein the particle comprises natural or synthetic clay, inorganic metal oxide, latex, or organic materials.

10. The composite particle of claim 1, wherein the particle comprises silica.

11. The composite particle of claim 1, wherein the particle is a proppant particulate substrate.

12. A method for forming a composite particle comprising a particle and a polymer at the surface of the polymer, the method comprising:
bonding a polymerization initiator at a surface of the particle, the polymerization initiator comprising an azo-group comprising a first and second end, a first anchoring agent and a second anchoring agent, the first and second anchoring agents being bonded to the first and second ends, respectively, of the azo-group, at least one of the first and second anchoring agents being bonded to the surface of the particle; and
bonding the polymer to the surface of the particle via the polymerization initiator.

13. The method of claim 12, wherein the polymer is bonded to the surface of the particle via a "grafting from" process.

14. The method of claim 12, wherein the polymer is bonded to the surface of the particle via a "grafting to" process.

15. The method of claim 12, wherein the polymerization initiator has the general structure of:

in which
$A_1$ and $A_2$ are the same as or different from one another and each comprise an attachment group,
$R_1$ and $R_2$ are the same as or different from one another and each comprise a linkage group,
$X_1$ and $X_2$ are the same as or different from one another and each comprise the first and second anchoring agents, respectively.

16. The method of claim 15, wherein $A_1$ and $A_2$ have the general structure:

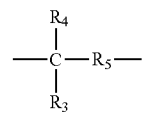

in which
$R_3$ and $R_4$ independently comprise H, CN, $CH_3$, $COOR_6$ ($R_6$=H or alkyl), or $C_2H_5$; and
$R_5$ is an alkyl group.

17. The method of claim 15, wherein $R_1$ and $R_2$ independently comprise a carbonyl-containing linkage, an amine-containing linkage, a thiol-containing linkage, a phosphonate linkage, an epoxy linkage, an alkene-containing linkage, or are a bond.

18. The method of claim 15, wherein $X_1$ and $X_2$ each independently comprise a thiol group, a phosphonate group, or a halogen.

19. The method of claim 12, comprising bonding at least one of the first and second anchoring agents to the surface via thiozoline reactivity or via succinimide reactivity.

20. The method of claim 12, comprising bonding the polymerization initiator to the surface via both the first and second anchoring agents.

* * * * *